(12) United States Patent
Gordin et al.

(10) Patent No.: US 10,471,649 B2
(45) Date of Patent: Nov. 12, 2019

(54) METHOD FOR IN-PROCESS FORMING OF COMPLEXLY SHAPED RIGID COMPOSITE TUBING

(71) Applicant: General Electric Company, Schenectady, NY (US)

(72) Inventors: Kevin Daniel Gordin, Camarillo, CA (US); Wendy Wen-Ling Lin, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 195 days.

(21) Appl. No.: 15/629,922

(22) Filed: Jun. 22, 2017

(65) Prior Publication Data
US 2018/0370113 A1 Dec. 27, 2018

(51) Int. Cl.
| | |
|---|---|
| *B29C 63/18* | (2006.01) |
| *B29C 70/34* | (2006.01) |
| *B65H 75/10* | (2006.01) |
| *B32B 1/08* | (2006.01) |
| *B29C 70/24* | (2006.01) |
| *B29D 23/00* | (2006.01) |
| *B29C 53/08* | (2006.01) |
| *B29C 53/82* | (2006.01) |
| *B29C 63/06* | (2006.01) |
| *B29L 9/00* | (2006.01) |
| *B29K 105/08* | (2006.01) |

(52) U.S. Cl.
CPC ............ *B29C 63/18* (2013.01); *B29C 53/083* (2013.01); *B29C 53/82* (2013.01); *B29C 63/06* (2013.01); *B29C 70/24* (2013.01); *B29C 70/345* (2013.01); *B29D 23/001* (2013.01); *B32B 1/08* (2013.01); *B65H 75/10* (2013.01); *B29K 2105/0872* (2013.01); *B29L 2009/00* (2013.01)

(58) Field of Classification Search
CPC ...................................................... B29C 63/18
See application file for complete search history.

(56) References Cited

U.S. PATENT DOCUMENTS

| | | | | |
|---|---|---|---|---|
| 3,993,726 A | * | 11/1976 | Moyer | B29B 15/122 264/171.12 |
| 4,891,179 A | * | 1/1990 | Peacock | B29C 33/485 264/166 |
| 4,892,600 A | * | 1/1990 | Beever | B29C 70/521 156/166 |

(Continued)

FOREIGN PATENT DOCUMENTS

| | | | |
|---|---|---|---|
| DE | 102011011577 A | * | 4/2012 |
| DE | 102011100546 A | * | 11/2012 |

(Continued)

OTHER PUBLICATIONS

Machine Translation of Korean Patent 1020150081561, Date Unknown.*

(Continued)

*Primary Examiner* — Jeffry H Aftergut
(74) *Attorney, Agent, or Firm* — General Electric; Kristi Davidson

(57) ABSTRACT

A method for forming a composite tube includes the steps of: braiding a plurality of strips to form a workpiece tube; bending the workpiece tube to form a bend; and extending the length of the workpiece tube by continuing the braiding step.

18 Claims, 8 Drawing Sheets

(56) References Cited

U.S. PATENT DOCUMENTS 6,464,916 B2     10/2002   Tyson
8,944,113 B2      2/2015   Shafer et al.

FOREIGN PATENT DOCUMENTS

| EP | 2868700 A1 | | 4/2015 |
|----|------------|---|--------|
| KR | 10-2015-0081561 A | * | 7/2015 |
| WO | 2011117607 A1 | | 9/2011 |

OTHER PUBLICATIONS

Machine Translation of German Patent 10201100546, Date Unknown.*
Machine Translation of German Patent 102011011577, Date Unknown.*

* cited by examiner

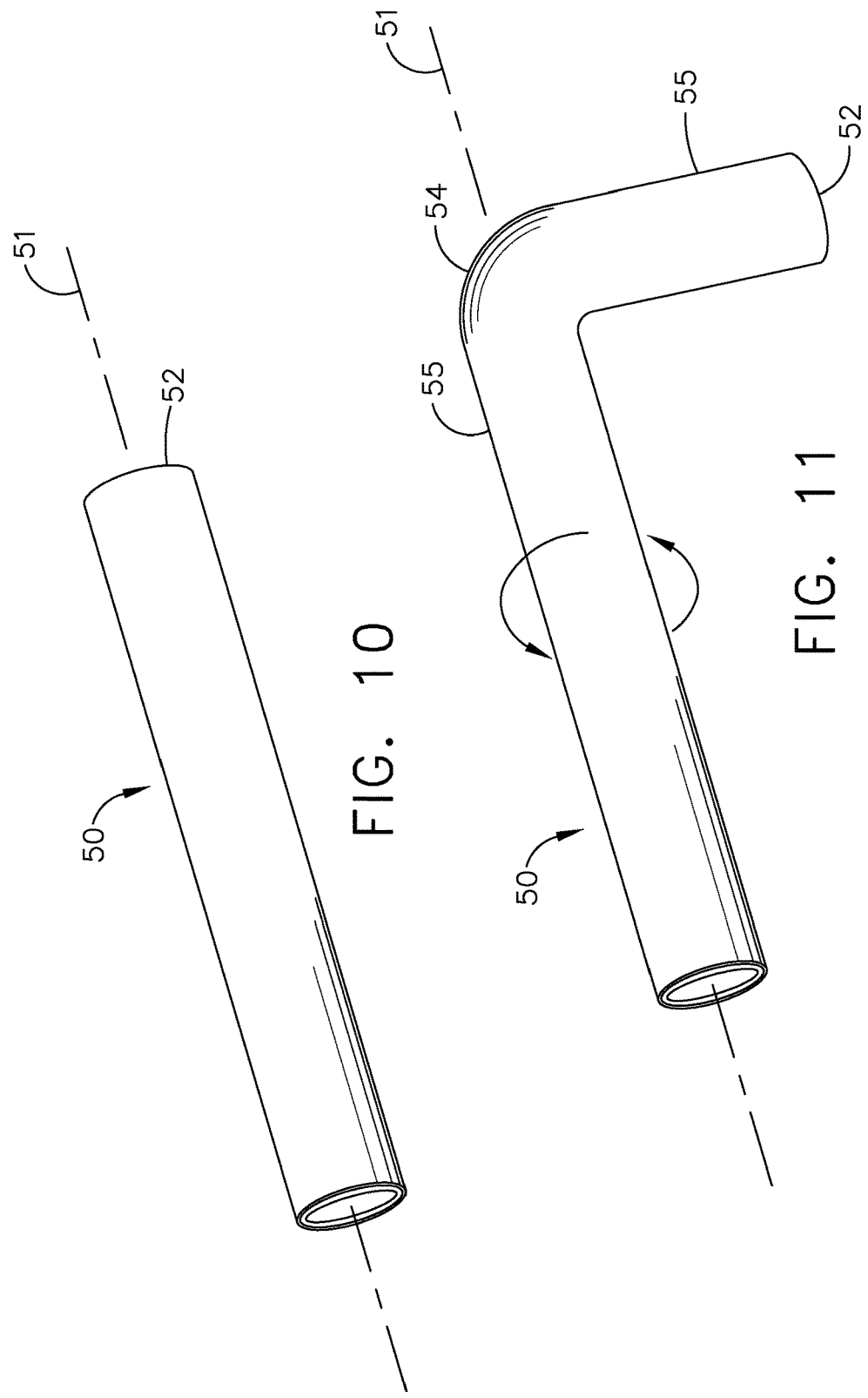

METHOD FOR IN-PROCESS FORMING OF COMPLEXLY SHAPED RIGID COMPOSITE TUBING

BACKGROUND OF THE INVENTION

The present invention relates to an apparatus and method for forming rigid composite tubing, and more specifically for forming complexly shaped rigid composite tubing in a single-line operation.

Aircraft engines utilize tubing to convey fluids within the engine. Conventionally, such tubing is metallic. One problem with metallic tubing is that it can be heavy and difficult to shape as required. Lighter tubing can be made of composite material. One problem with composite tubing is that it is expensive and difficult to shape. In addition, conventional methods for shaping composite tubing often require separate tooling for each shape and length of composite tubing.

BRIEF DESCRIPTION OF THE INVENTION

This problem is addressed by an apparatus and method for in-line formation of and shaping of composite tubing around a flexible polymer core.

According to one aspect of the technology described herein there is provided a method for forming a composite tube. The method includes the steps of: braiding a plurality of strips to form a workpiece tube; bending the workpiece tube to form a bend; and extending the length of the workpiece tube by continuing the braiding step.

BRIEF DESCRIPTION OF THE DRAWINGS

The invention may be best understood by reference to the following description, taken in conjunction with the accompanying drawing figures in which:

FIG. 10 is a perspective view of a workpiece tube prior to bending;

FIG. 11 a perspective view of the workpiece tube shown in FIG. 10 after a first bend has been completed in accordance with a method described herein;

DETAILED DESCRIPTION OF THE INVENTION

Figure 1:
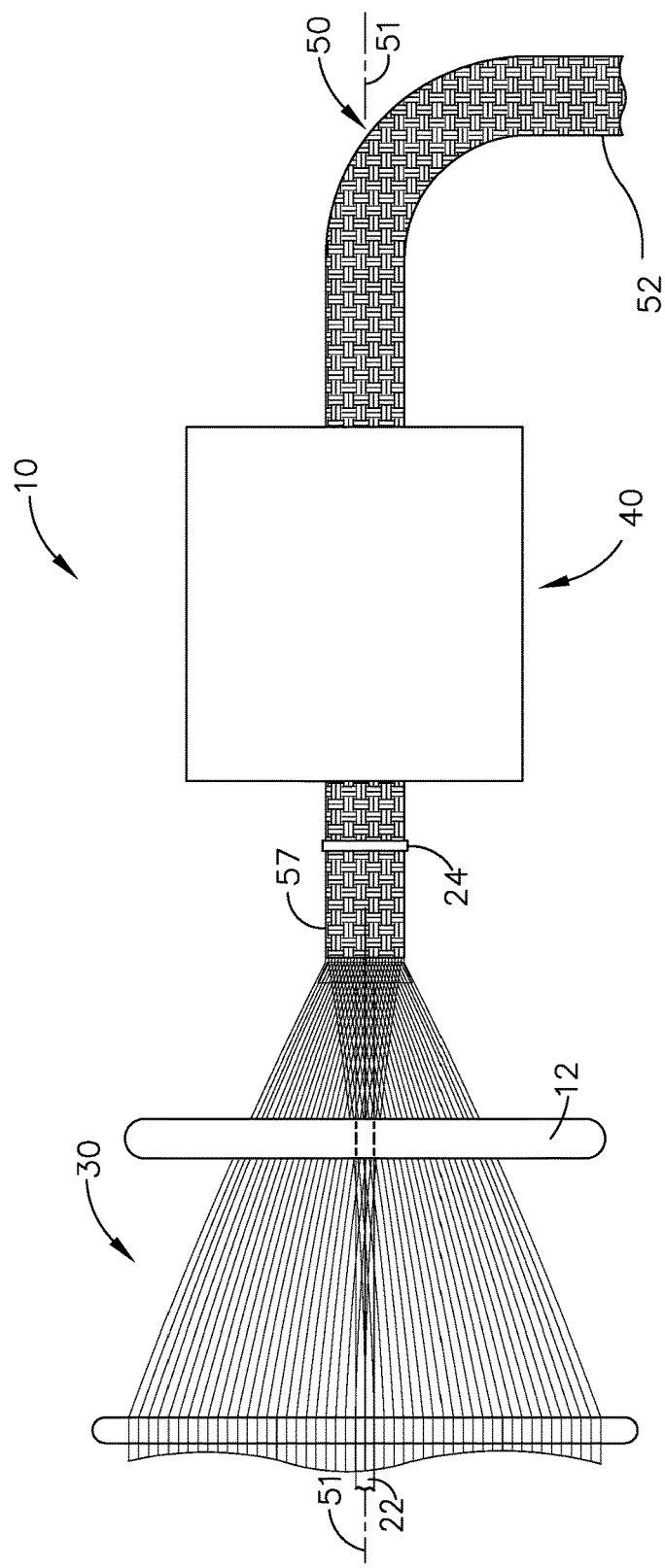
FIG. 1 is a schematic side view of a tube forming apparatus that includes a braiding machine that is positioned near a bending apparatus.
Figure 2:
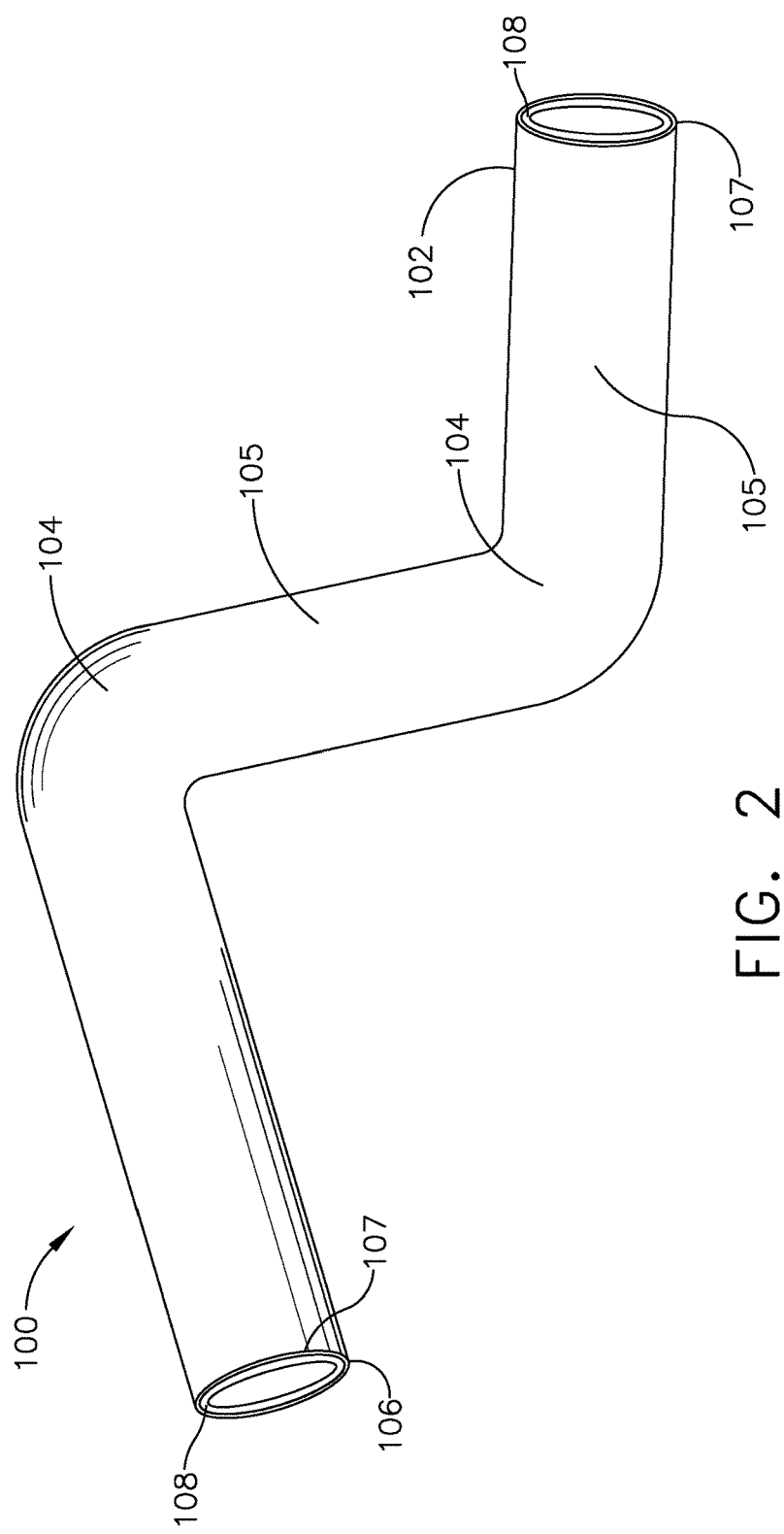
FIG. 2 is a perspective view of a tube made in accordance with a method described herein.

Referring to the drawings wherein identical reference numerals denote the same elements throughout the various views, FIG. 1 depicts a tube forming apparatus 10. The tube forming apparatus 10 is configured to manufacture composite tubing 100, FIG. 2, in a single-line operation. As shown, the end product composite tubing 100 includes bends 104 and straight sections 105 that are positioned between a first end 102 and a second end 106. Composite tube 100 includes a braided outer section 107 and an inner wall 108.

As illustrated, the bends 104 are about 90°. It should be appreciated that the bends 104 can be other angles. It should also be appreciated that the composite tubing 100 is considered to be rigid. As used herein, the term "rigid" refers to tubing that is configured to generally retain its shape under the expected operating conditions as would be understood by one skilled in the art.

Referring now to FIG. 1, the tube forming apparatus 10 includes a braiding machine 12 and a bender 40. The braiding machine 12 is configured to receive a working end of a polymeric tubing 22. The polymeric tubing 22 can be PTFE (e.g. TEFLON) or other thermoplastic polymer such as polyester, nylon, polypropylene, polyetherimide, polysulfone, and the like. According to the illustrated embodiment, the polymeric tubing 22 is configured to be inflated during the forming and bending process with a gas such as air, nitrogen, helium, argon, or a combination thereof. The polymeric tubing 22 may also be configured to be inflated with liquid such as water or oil. The inflated polymeric tubing 22 is introduced into the braiding machine 12 from a generally continuous source (not shown).

Figure 3:
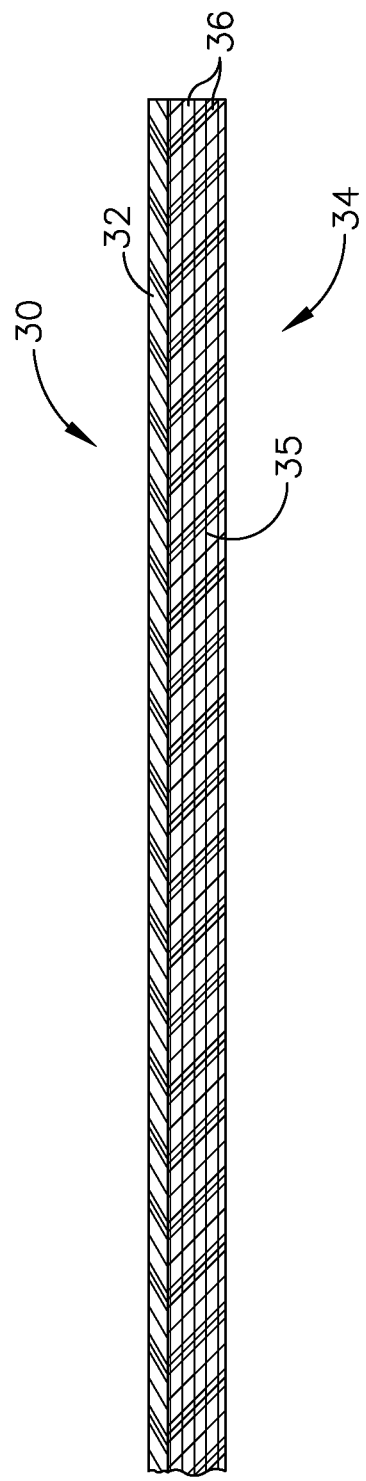
FIG. 3 shows a side view of a composite tape used in accordance with a method described herein to form the tubing of FIG. 2.

The braiding machine 12 is also configured to receive a plurality of carbon fiber tape strips 30. As shown in FIG. 3, the strips 30 each include a thermoplastic film layer 32 and a pre-preg matrix layer 34. As used herein, the term "pre-preg" refers to fibrous material that is pre-impregnated with a thermoplastic. A plurality of continuous fibers 36 is embedded within a thermoplastic material 35 of the pre-preg matrix layer 34. As used herein, the term "continuous fiber" refers to a filament that is longer than a staple fiber as would be understood by one skilled in the art. According to the illustrated embodiment, the continuous fiber 36 is carbon fiber. By way of example and not limitation, the continuous fiber 36 can be one of the following: glass, KEVLAR, NEXTEL, silicon carbide, metal, or a combination thereof.

Figure 4:
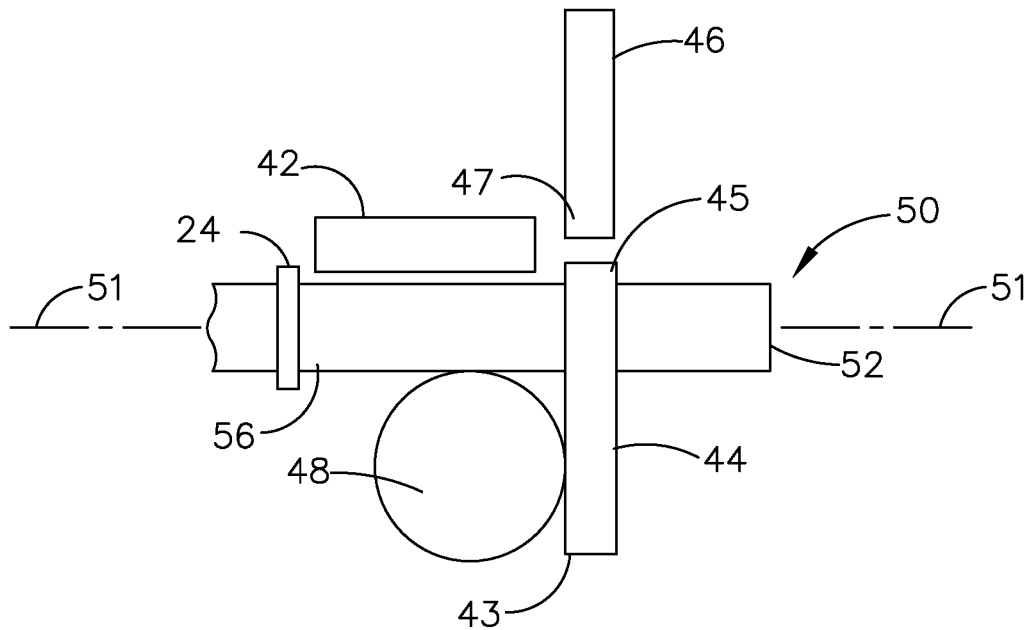
FIG. 4 is a schematic view of the bending apparatus in a first stage configuration prior to an initial bend being made.

The braiding machine 12 is configured to braid the strips 30 around the tubing 22. In this manner, a workpiece tube 50 is created. The workpiece tube 50 extends around an axis 51 to an end 52 from the braiding machine 12 through a sizing ring 24 and into the bender 40. Referring to FIG. 4, the bender 40 includes a heater 42, a first arm 44, a second arm 46, and an anvil 48. The workpiece tube 50 includes a braided outer section 57 and an inner wall 58, see FIG. 12. The braided outer section 57 is formed from a plurality of strips 30 and the inner wall 58 is formed from the tubing 22. The braiding machine 12, the second arm 46, and the workpiece 50 are configured to rotate about the axis 51 of the workpiece tube 50.

The components of the bender 40 are configured to move between five different configurations. Referring to FIG. 1, the bender 40 is configured such that the workpiece tube 50 can extend therethrough during a braiding or forming step. There are four additional stages that the bender 40 moves through during a bending process.

The bender 40 is configured to move into the first stage, shown in FIG. 4, prior to a bending step being performed on the workpiece tube 50. In this regard, the first arm 44 is configured to move between a first position where the first arm 44 is spaced away from the workpiece tube 50 and a second position where the gripping portion 45 of the first arm 44 is engaged with the workpiece tube 50. The first arm 44 gripping portion 45 is configured to guide and retain the workpiece tube 50. The workpiece tube 50 is movable relative to the gripping portion 45 when the workpiece tube 50 is retained therein.

Figure 5:
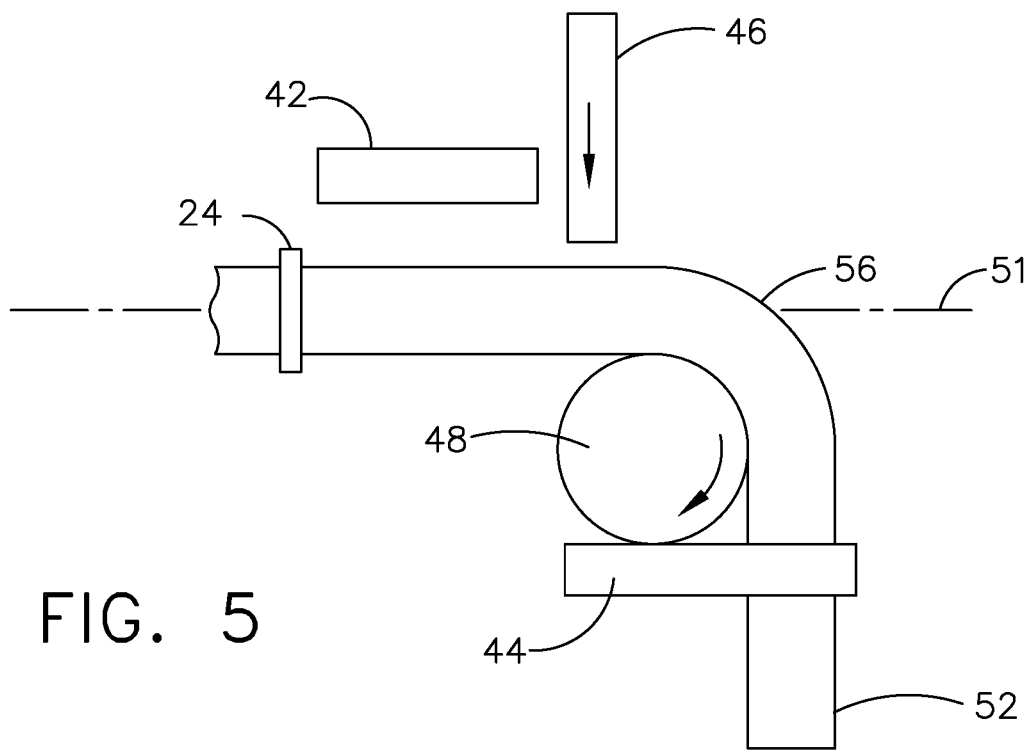
FIG. 5 is a schematic view of the bending apparatus positioned in a second stage configuration after an initial bend has been made.

A second stage, shown in FIG. 5, will be described below. The workpiece 50 is bent during a transition between the first stage and the second stage. Regarding this transition, the first arm 44 is configured to pivot about a pivot point 43 between a first position and a second position. The anvil 48 of the bender 40 is also movable between a first position and a second position. The anvil 48 is configured to move in cooperation with the first arm 44 as they move between the respective first and second positions. In the first stage, when both the first arm 44 and anvil 48 are in the first position, the anvil 48 is positioned to the left of first arm 44 as shown in FIG. 4.

The end 52 of the workpiece tube 50 is positioned closer to the first arm 44 when the bender 40 is in the second stage than when the bender 40 is in the first stage. Also, when the apparatus 10 is in the second stage, the anvil 48 is located above the first arm 44 such that the anvil 48 is between the first arm 44 and the workpiece 50. The anvil 48 is positioned such that it defines at least a portion of a curve 56 within the workpiece 50.

Figure 6:
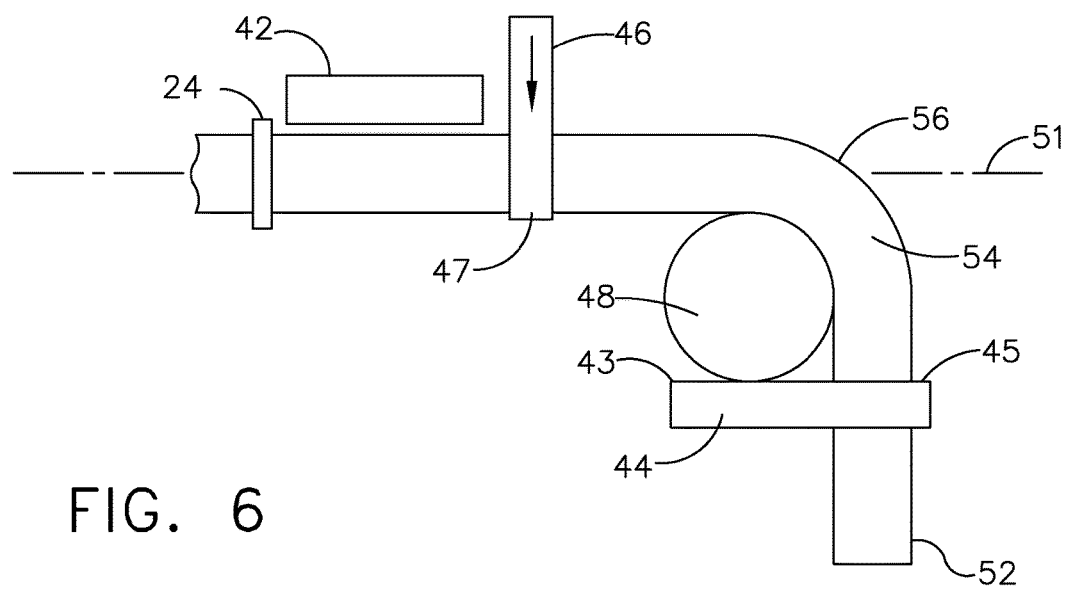
FIG. 6 is a schematic view of the bending apparatus positioned in transition between the second stage and a third stage configuration.
Figure 7:
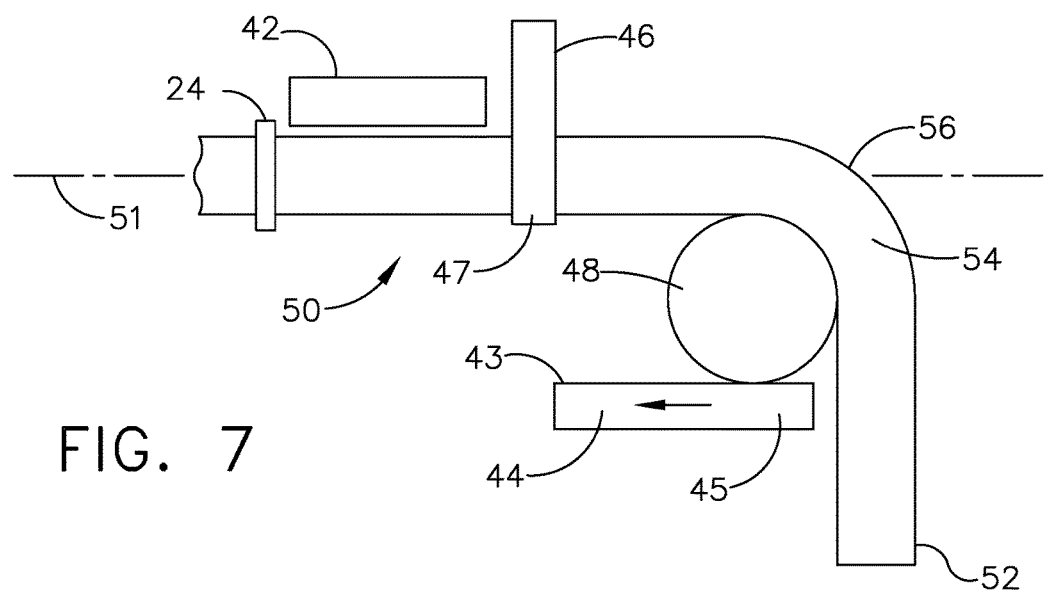
FIG. 7 is a schematic view of the bending apparatus positioned in transition further between the second stage and a third stage configuration.
Figure 8:
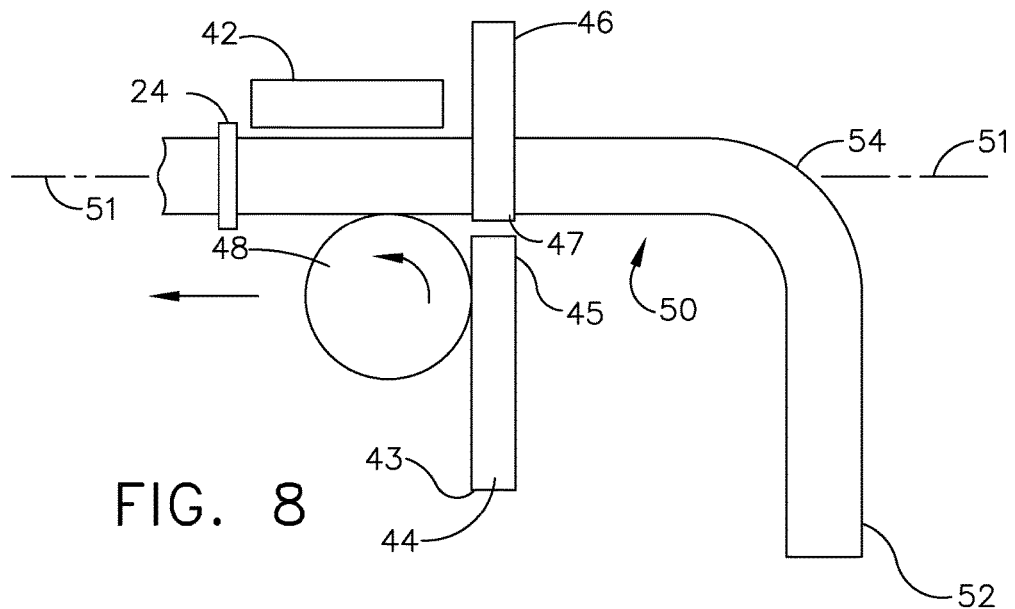
FIG. 8 is a schematic view of the bending apparatus positioned in a third stage configuration.

When the bender 40 is in the third stage configuration it is configured to rotate such that the workpiece 50 rotates about the axis 51 along with the braiding machine 12. The transition between the second stage and the third stage is shown in FIG. 6 and FIG. 7. The second arm 46 is configured to move from a ready position to a first gripping position in the third stage which is shown in FIG. 8. The second arm 46 is also configured to move between its first gripping position and a second gripping position. This movement typically occurs during a step of rotating the workpiece about the axis 51. Finally, the second arm 46 is configured to move between the second position and the ready position.

The technology described herein can better understood through a description of the operation thereof. In a tube braiding or forming step the tubing 22 is inflated and positioned such that it extends through the braiding machine 12. Composite fiber strips 30 are braided around the tubing 22. In this manner, workpiece tube 50 is formed around the axis 51. Workpiece tube 50 is continuously created and progressed forward through the sizing ring 24 of the tube forming apparatus 10. During the tube forming step, bender 40 is positioned such that the first arm 44 and the second arm 46 are clear of the workpiece tube 50.

When workpiece tube 50 reaches a predetermined length, the tube forming step is stopped. According to the illustrated embodiment, a heating step is initiated in which a heater 42 is operated. The heater 42 is operated until a zone 56 of the workpiece tube 50 is positioned within range of the heater 42 and has been heated such that the thermoplastic film layer 32 of composite fiber strips 30 has reached a predetermined temperature. It should be appreciated that the predetermined temperature is below the melting point and is chosen to facilitate bending. The predetermined temperature and is preferably above the glass transition temperature.

After the heated zone 56 has reached the predetermined temperature, a bending operation is commenced. The bender is positioned in the first stage as shown in FIG. 4 such that the gripping portion 45 of the first arm 44 engages the workpiece tube 50 and the heated zone 56 is positioned near the anvil 48.

The workpiece tube 50 is bent during a bending step to form a bend 54. The bending step occurs as the bender 40 is transitioned from the first stage configuration described above to the second stage configuration shown in FIG. 5. The zone 56 is bent around the anvil 48 to form the bend 54 such that the bend 54 has a predetermined radius and a predetermined angle. This bend is illustrated by comparing FIG. 10 which shows the workpiece tube 50 prior to the first bend to FIG. 11 which shows the workpiece tube 50 after the first bend, including a bend 54 and straight sections 55. In the illustrated embodiment the predetermined angle is approximately 90°. The workpiece tube 50 is allowed to cool during a cooling step.

After the cooling step, the second arm 46 is operated such that an engaging portion 47 engages the workpiece 50. The anvil 48 and the first arm 44 are disengaged from the workpiece 50. Stated another way, bender 40 is moved to the third stage configuration as shown in FIG. 8.

Figure 9:
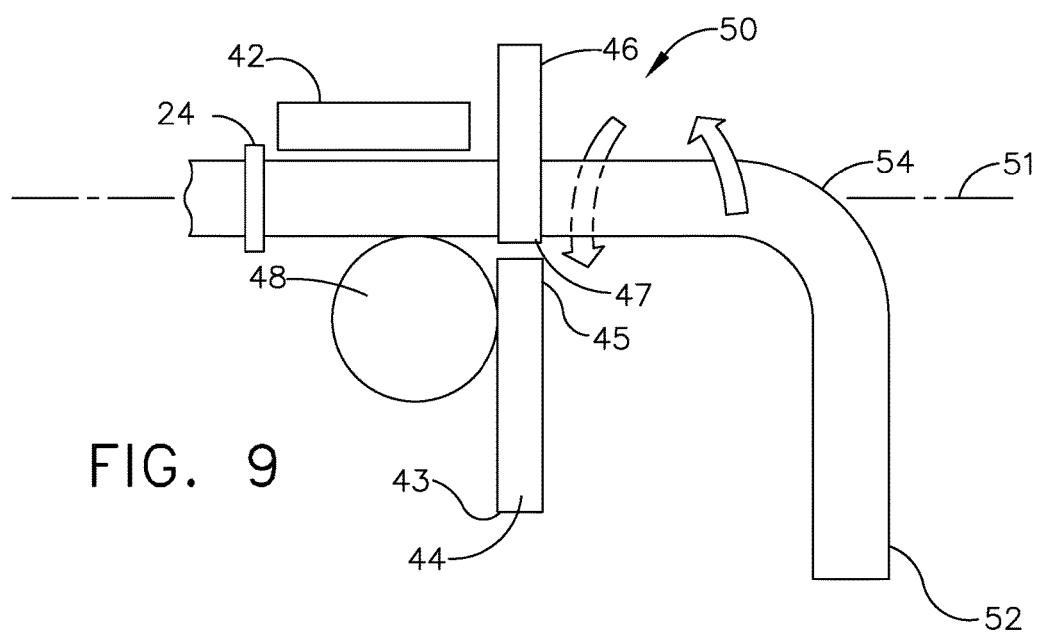
FIG. 9 is a schematic view of the bending apparatus during a realignment rotating step that occurs from the third stage configuration.
Figure 12:
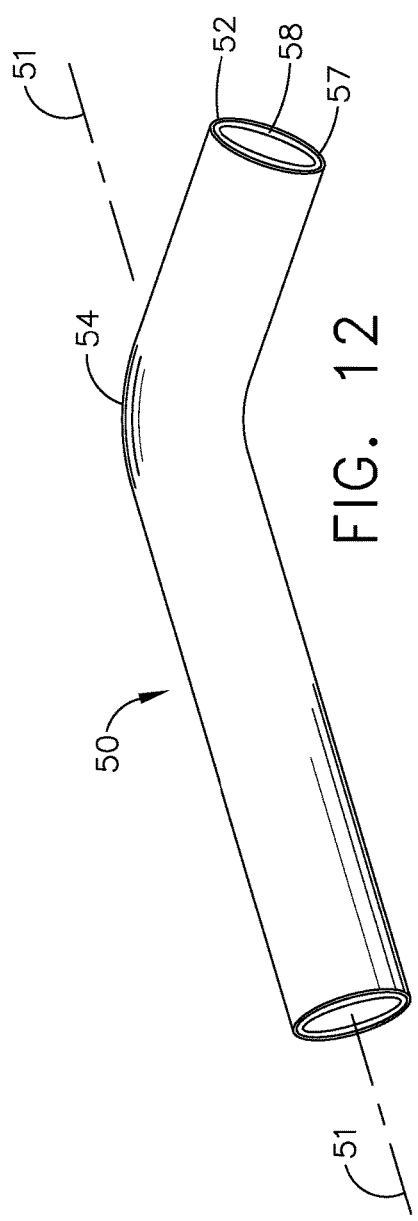
FIG. 12 is a perspective view of the workpiece tube shown in FIG. 11 after the workpiece tube has been rotated about an axis prior to a second bend being formed.
Figure 13:
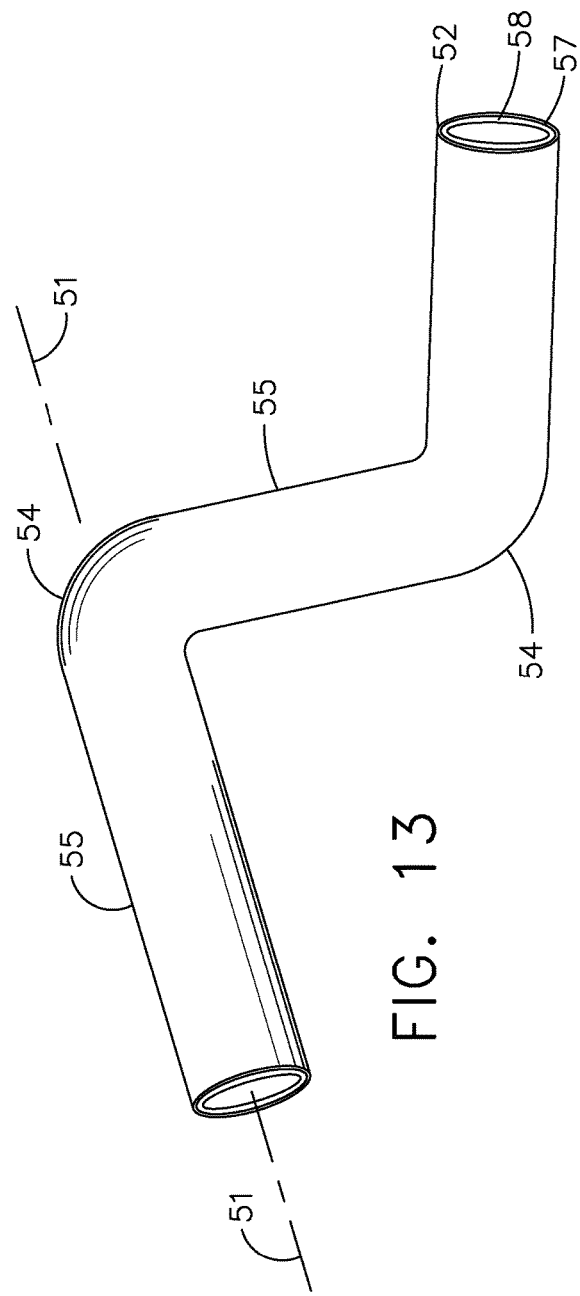
FIG. 13 is a perspective view of the workpiece tube shown in FIG. 12 after the second bend has been formed.

Referring now to FIG. 9, the braiding machine 12 and the second arm 46 are operated such that the workpiece tube is rotated about the axis 51 a predetermined amount such that it is in position for a subsequent bending step. This rotation is further illustrated by FIG. 11 and FIG. 12. FIG. 11 shows the workpiece tube 50 positioned after the first bend prior to rotation and FIG. 12 shows the workpiece tube 50 positioned after the rotation such that the end 52 of the workpiece tube 50 is in a different plane. The above described process can be repeated such that the workpiece tube 50 has additional bends 52 formed therein as illustrated by FIG. 13. In this regard, the bender 40 is returned to the configuration suitable for tube formation and the tube forming step begun. Subsequent steps are initiated as required. This can be repeated as required until the workpiece tube 50 can then be cut to form the tube 100.

According to an alternative embodiment, the heater 42 can be operated to heat all portions of the workpiece tube 50 including those that will not be bent. According to another alternative embodiment heating of the workpiece tube 50 to form the tube 100 does not occur until after all bends are made. This final heating can be done off-line away from the apparatus 10.

The invention is an apparatus and method for in-line formation of a composite tubing. The commercial advantages of the disclosed technology include increased speed of manufacturing compared to conventional methods, reduced tooling needed compared to conventional methods, and resulting decrease in costs relative to tubing made with conventional methods.

The foregoing has described an apparatus and method for rigid composite tubing, and more specifically for forming complexly shaped rigid composite tubing in a single-line operation. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method for forming a composite tube, the method comprising the steps of:
   providing an apparatus for forming a tube that includes a braiding machine and a bender that includes a sizing ring, a heater, a first arm, an anvil, and a second arm;
   braiding a plurality of strips to form a workpiece tube;
   bending the workpiece tube to form a bend; and
   extending the length of the workpiece tube by continuing the braiding step.

2. The method according to claim 1, wherein the strips are braided around a polymeric tube to form the workpiece tube.

3. The method according to claim 2, wherein the polymeric tube is inflated.

4. The method according to claim 3, wherein the polymeric tube is fed into a braiding machine.

5. The method according to claim 2, wherein the strips include fibers.

6. The method according to claim 5, wherein the fibers are embedded in a polymeric matrix to form a pre-preg layer.

7. The method according to claim 6, wherein the strips include a thermoplastic layer that is adjacent to the pre-preg layer.

8. The method according to claim 1, further comprising the step of rotating the workpiece tube to form another bend.

9. The method according to claim 8, further comprising the step of additionally extending the length of the workpiece tube.

10. The method according to claim 9, further comprising the step of passing the workpiece tube through a sizing ring.

11. A method for forming a composite tube, the method comprising the steps of:
    providing an apparatus for forming a tube that includes a braiding machine and a bender that includes a sizing ring, a heater, a first arm, an anvil, and a second arm;
    braiding a plurality of strips around an inflated polymeric tube to form a workpiece tube;
    bending the workpiece tube to form a bend; and
    extending the length of the workpiece tube.

12. The method according to claim 11, wherein the polymeric tube is fed into the braiding machine.

13. The method according to claim 12, wherein the strips include fibers.

14. The method according to claim 13, wherein the fibers are embedded in a polymeric matrix to form a pre-preg layer.

15. The method according to claim 14, wherein the strips include a thermoplastic layer that is adjacent to the pre-preg layer.

16. The method according to claim 11, further comprising the step of rotating the workpiece tube to form another bend.

17. The method according to claim 16, further comprising the step of additionally extending the length of the workpiece tube.

18. The method according to claim 17, further comprising the step of passing the workpiece tube through a sizing ring.

* * * * *